United States Patent

(12) United States Patent
Lu

(10) Patent No.: US 9,066,352 B2
(45) Date of Patent: Jun. 23, 2015

(54) WIRELESS NETWORK CONNECTION METHOD OF ELECTRONIC DEVICE AND ELECTRONIC DEVICE THEREOF

(71) Applicant: Acer Incorporated, New Taipei (TW)

(72) Inventor: Yi-Wei Lu, New Taipei (TW)

(73) Assignee: Acer Incorporated, New Taipei (TW)

( * ) Notice: Subject to any disclaimer, the term of this patent is extended or adjusted under 35 U.S.C. 154(b) by 125 days.

(21) Appl. No.: 13/965,217

(22) Filed: Aug. 13, 2013

(65) Prior Publication Data
US 2014/0328209 A1 Nov. 6, 2014

(30) Foreign Application Priority Data
May 3, 2013 (TW) .............................. 102115930 A

(51) Int. Cl.
H04W 72/04 (2009.01)
H04W 80/04 (2009.01)
H04W 84/12 (2009.01)
H04W 88/06 (2009.01)

(52) U.S. Cl.
CPC ............ *H04W 72/048* (2013.01); *H04W 84/12* (2013.01); *H04W 80/04* (2013.01); *H04W 88/06* (2013.01)

(58) Field of Classification Search
None
See application file for complete search history.

(56) References Cited

U.S. PATENT DOCUMENTS

| 2003/0142641 A1 | 7/2003 | Sumner et al. | |
| 2008/0026788 A1* | 1/2008 | Hamada | 455/552.1 |
| 2008/0101330 A1* | 5/2008 | Cheng | 370/350 |
| 2009/0086697 A1* | 4/2009 | Okada | 370/338 |
| 2011/0170484 A1* | 7/2011 | Nagai et al. | 370/328 |
| 2012/0170471 A1 | 7/2012 | Brown et al. | |
| 2012/0294241 A1* | 11/2012 | Palm | 370/328 |

FOREIGN PATENT DOCUMENTS

| CN | 101854740 | 10/2010 |
| TW | 201031164 | 8/2010 |

* cited by examiner

*Primary Examiner* — Hong Cho
(74) *Attorney, Agent, or Firm* — Jianq Chyun IP Office

(57) ABSTRACT

A wireless network connection method of an electronic device is provided. The electronic device has an access point (AP) mode and a station (ST) mode. When the electronic device starts a wireless network connection function, the electronic device is switched to the ST mode. Electronic devices in the AP mode are searched within a nearby area. If no electronic device in the AP mode is found, the electronic device is switched to the AP mode to automatically connect to a wireless network, and wireless network services are provided to other electronic devices in the ST mode in the nearby area. If electronic devices in the AP mode are found, the weights of the electronic devices are respectively calculated to set one of the electronic devices as a primary AP, and the electronic devices other than the primary AP are allowed to connect to the wireless network through the primary AP.

16 Claims, 3 Drawing Sheets

WIRELESS NETWORK CONNECTION METHOD OF ELECTRONIC DEVICE AND ELECTRONIC DEVICE THEREOF

CROSS-REFERENCE TO RELATED APPLICATION

This application claims the priority benefit of Taiwan application serial no. 102115930, filed on May 3, 2013. The entirety of the above-mentioned patent application is hereby incorporated by reference herein and made a part of this specification.

BACKGROUND OF THE INVENTION

1. Field of the Invention

The present invention generally relates to a communication technique, and more particularly, to a wireless network connection method of an electronic device and an electronic device thereof.

2. Description of Related Art

Along with the rapid development of technologies and manufacturing processes, various smart electronic products have been widely used in our daily life. Accordingly, nowadays, people rely more and more on wireless network connections. Some long-range wireless communication techniques, such as Wi-Fi, General Packet Radio Service (GPRS), and Code Division Multiple Access (CDMA), and some short-range wireless communication techniques, such as Wi-Fi Direct, Bluetooth, and Near Field Communication (NFC), are the most common ones among existing wireless network connection techniques.

However, both the Wi-Fi Direct and the NFC techniques require the support of specific hardware. Besides, taking the Wi-Fi Direct communication between devices using the Windows operating system or the Android operating system as an example, only one-to-one or one-to-few connections can be established. Thus, there are many connection restrictions in the Wi-Fi Direct communication technique. The Bluetooth technique offers a long searching time between devices and a narrow bandwidth. The NFC technique requires close contact between devices and also offers a narrow bandwidth. The Alljoyn technique requests all devices to be connected to a specific access point (AP).

When people use various smart electronic products to establish wireless network connections, they may encounter different environmental changes or moving factors any time. Thus, a wireless network connection technique which allows wireless network connections to be instantly adjusted in response to changing situations and can be constructed on existing communication standards and hardware structures is desired.

SUMMARY OF THE INVENTION

Accordingly, the present invention is directed to a wireless network connection method and an electronic device. In the present invention, a plurality of electronic devices within a certain range is allowed to automatically detect each other, and a most suitable wireless network service provider is selected among the electronic devices. Thus, when different environmental changes or moving factors are encountered, corresponding connections can be automatically adjusted so that the electronic devices can automatically and smoothly connect to the wireless network through the stable wireless network service provider.

The present invention provides a wireless network connection method of an electronic device. The electronic device has an access point (AP) mode and a station (ST) mode. The wireless network connection method includes following steps. When the electronic device starts a wireless network connection function, the electronic device is switched to the ST mode. At least one other electronic device in the AP mode is searched for within a nearby area. If the at least one other electronic device in the AP mode is not found, the electronic device is switched to the AP mode to allow the electronic device to automatically connect to a wireless network, and wireless network services are provided to at least one other electronic device in the ST mode within the nearby area. If the at least one other electronic device in the AP mode is found, the weights of the at least one other electronic device in the AP mode and the electronic device are respectively calculated to set one of the at least one other electronic device in the AP mode and the electronic device as a primary AP, and the at least one other electronic device in the AP mode and the electronic device other than the primary AP are allowed to connect to the wireless network through the primary AP.

The present invention provides an electronic device for establishing a wireless network connection. The electronic device includes a connection unit, a storage unit, and a control unit. The connection unit has an AP mode and a ST mode. The storage unit is configured to store a weight. The control unit is coupled to the connection unit and the storage unit and configured to switch the electronic device to the AP mode or the ST mode. When the electronic device enters a wireless network connection procedure, the control unit is configured to control following steps. When the electronic device starts a wireless network connection function, the electronic device is switched to the ST mode. At least one other electronic device in the AP mode is searched for within a nearby area. If the at least one other electronic device in the AP mode is not found, the electronic device is switched to the AP mode to allow the electronic device to automatically connect to a wireless network, and wireless network services are provided to at least one other electronic device in the ST mode within the nearby area. If the at least one other electronic device in the AP mode is found, the weights of the at least one other electronic device in the AP mode and the electronic device are respectively calculated to set one of the at least one other electronic device in the AP mode and the electronic device as a primary AP, and the at least one other electronic device in the AP mode and the electronic device other than the primary AP are allowed to connect to the wireless network through the primary AP.

As described above, an embodiment of the present invention provides an electronic device, in which the weights of electronic devices in an AP mode found within a nearby area and the current electronic device are respectively calculated to set one of the electronic devices in the AP mode and the current electronic device as a primary AP, and the electronic devices other than the primary AP are allowed to connect to a wireless network through the primary AP, so that the connections can be adjusted in response to different environmental changes or moving factors and the electronic devices can automatically connect to the wireless network through the stable primary AP.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated

DESCRIPTION OF THE EMBODIMENTS

Figure 1:
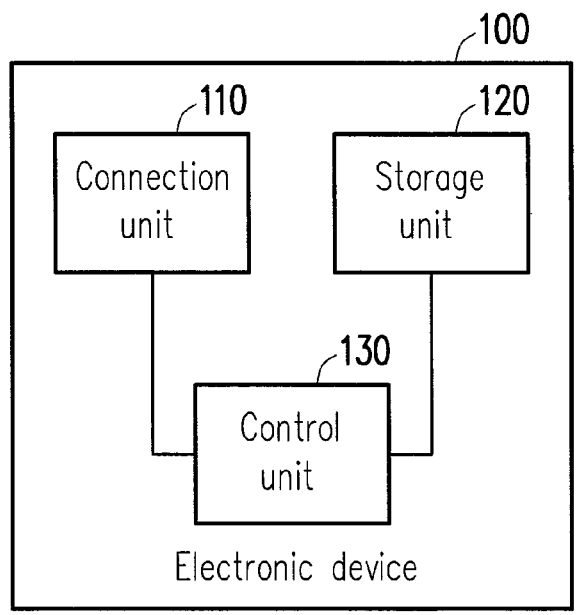
FIG. 1 illustrates an electronic device for connecting to a wireless network according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates an electronic device for connecting to a wireless network according to an embodiment of the present invention. As shown in FIG. 1, the electronic device 100 includes a connection unit 110, a storage unit 120, and a control unit 130. The control unit 130 is coupled to the connection unit 110 and the storage unit 120.

The electronic device 100 may be a network server, a desktop computer, a notebook computer, a tablet PC, a smart phone, or any device which can provide wireless network services and a network connection function. The type of the electronic device 100 is not limited herein. The connection unit 110 has an access point (AP) mode and a station (ST) mode. The connection unit 110 in the present embodiment may be a wireless communication chip or related hardware compliant with a wireless network connection method provided by the present invention, such as a WIFI wireless network card. When the connection unit 110 is in the AP mode, the electronic device 100 issues a message indicating that wireless network services can be provided by transmitting a specific packet. On the other hand, when the connection unit 110 is in the ST mode, the electronic device 100 can get to know whether there are available wireless network services within a nearby area by searching and receiving a specific packet in the nearby area. The control unit 130 determines whether to switch the electronic device 100 to the AP mode or the ST mode through the wireless network connection method in each of following embodiments of the present invention. The control unit 130 may be a chip or a microprocessor. However, the type of the control unit 130 is not limited herein. The storage unit 120 stores a weight. The weight is a reference value used for determining whether to switch the electronic device 100 to the AP mode to provide wireless network services in the nearby area. The storage unit 120 may be a hard disc, a flash memory, a random access memory (RAM), a cache memory, or any other storage medium. However, the type of the storage unit 120 is not limited herein.

Figure 2:
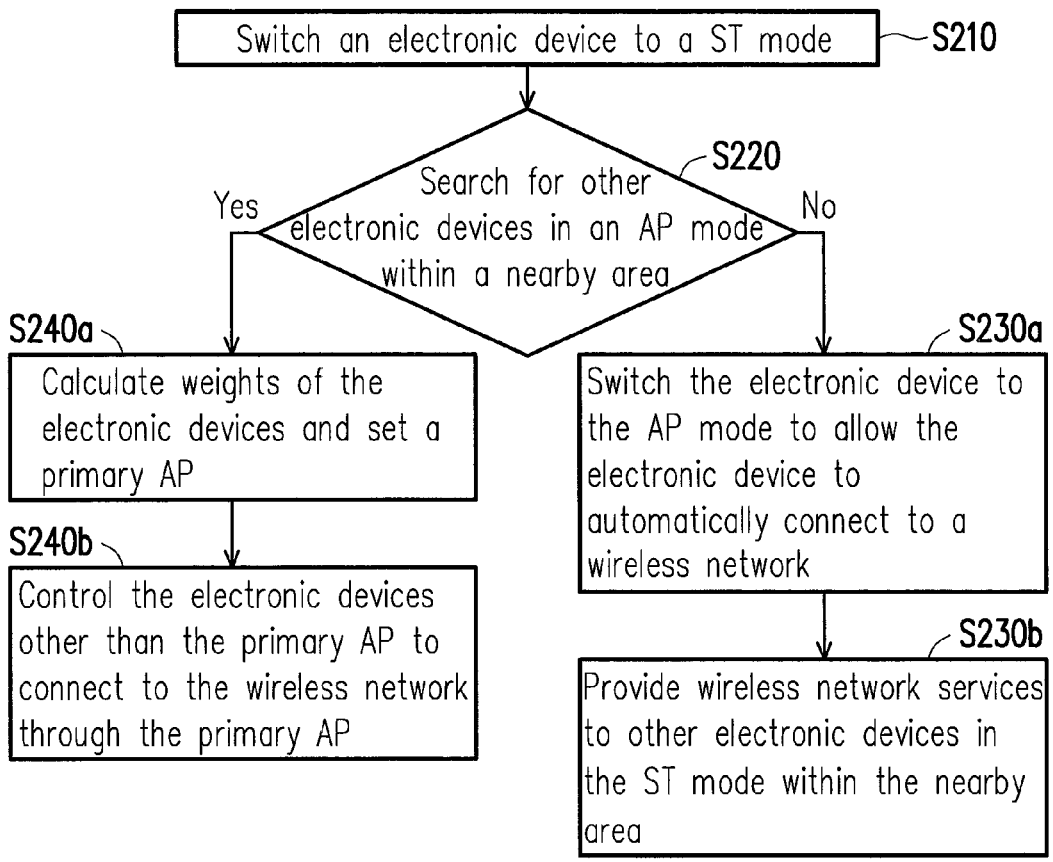
FIG. 2 is a flowchart of a wireless network connection method according to an embodiment of the present invention.

FIG. 2 is a flowchart of a wireless network connection method according to an embodiment of the present invention. As shown in FIG. 2, the wireless network connection method in the present embodiment includes steps S210-S220, S230a-S230b, and S240a-S240b.

In step S210, when the electronic device 100 starts a wireless network connection function, the control unit 130 switches the electronic device 100 to the ST mode to search for wireless network services. In the present embodiment, the electronic device 100 uses the ST mode as its default start mode, the reason of which will be explained below.

In step S220, the control unit 130 searches for at least one other electronic device in the AP mode within the nearby area. For example, the control unit 130 searches for other electronic devices in the AP mode within the nearby area during a first time interval (for example, 1-5 minutes). If the searching time exceeds the first time interval, it is considered that the control unit 130 does not find any electronic device in the AP mode. In the present embodiment, for the convenience of description, "APs" refers to other electronic devices in the AP mode, and "STs" refers to other electronic devices in the ST mode. Before the electronic device 100 starts the wireless network connection function, the electronic device 100 does not know whether there are other electronic devices in the AP mode within the nearby area. Thus, when the wireless network connection function is started, in step S210, the electronic device 100 is switched to the ST mode, so that the electronic device 100 won't compete for a ST with an existing AP or cause any conflict in network communication with the existing AP or ST after it transmits the specific packet within the nearby area.

In step S230a, if the control unit 130 does not find at least one other electronic device in the AP mode, the control unit 130 switches the electronic device 100 to the AP mode, so that the electronic device 100 can automatically connect to a wireless network. Next, in step S230b, wireless network services are provided to at least one other electronic device in the ST mode within the nearby area. Because the control unit 130 already determines that there is no electronic device in the nearby area providing any wireless network service, the control unit 130 switches the electronic device 100 to the AP mode, so that other electronic devices in the ST mode within the nearby area can connect to a wireless network by using the wireless network services provided by the electronic device 100. In other words, the electronic device 100 is currently a primary AP within the nearby area.

In step S240a, if the control unit 130 finds at least one other electronic device in the AP mode, the control unit 130 calculates the weights of the at least one other electronic device in the AP mode to set one of the at least one other electronic device in the AP mode as a primary AP. Next, in step S240b, the electronic device 100 and the at least one other electronic device in the AP mode other than the primary AP are controlled to connect to the wireless network through the primary AP. Herein those electronic devices other than the primary AP already know the primary AP through the calculation of the weights therefore can obtain the wireless network services through the primary AP in the nearby area. In an embodiment of the present invention, the electronic device having the greatest weight among the at least one other electronic devices in the AP mode is set as the primary AP. The electronic device having the greatest weight possesses the highest capability for providing wireless network services, a specific wireless communication protocol type, specific machine specifications, or other attributes. However, the present invention is not limited thereto. In another embodiment of the present invention, the control unit 130 further sets another one of the at least one other electronic device in the AP mode as a secondary AP by using the weights of the at least one other electronic devices in the AP mode. When the primary AP cannot continue to provide wireless network services due to any special reason, the secondary AP instantly replaces the primary AP to provide the wireless network services. Thereby, the time and other costs for re-calculating the weights can be saved.

After step S230b or S240b is executed (i.e., a primary AP is set among all electronic devices within the nearby area and a stable connection condition is achieved), the electronic devices within the nearby area can connect to the wireless network through the wireless network services provided by the primary AP. In addition, the electronic devices within the nearby area may also execute media sharing, file transmission, instant messaging, Alljoyn application programs, or other applications through the primary AP. However, the present invention is not limited herein. Because the other electronic devices in the AP mode and the electronic device 100 may be software APs, in another embodiment of the present invention, an electronic device connecting to the primary AP can get to know the existence of a hardware AP within the nearby area through a notification message issued by the primary AP and connect to the wireless network through this hardware AP, so that the connection performance can be improved.

The service set identifier (SSID) of an electronic device is shown in following table 1 according to an embodiment of the present invention.

According to the SSID 300 in foregoing table 1, it can be determined that a specific identifier of the electronic device 100 is "246824", the communication protocol type thereof is file exchange, the device type thereof is desktop computer, the electronic device 100 possesses the Internet connection capability, the power supply mode thereof is AC, the battery state thereof is the lowest state (if the power supply mode of an electronic device is AC, the battery state of the electronic device can be a negative or meaningless value, which is not limited herein), and the device name thereof is "135791357913579". The length of the SSID 300 of the electronic device 100 and the purposes of the fields may have many variations and are not limited herein.

In an embodiment of the present invention, when the electronic device 100 is in the AP mode, the electronic device 100 broadcasts a packet with its SSID. Thus, other electronic devices in the ST mode within the nearby area can get to know about the existence of the electronic device 100 in the AP mode and the attributes thereof by receiving the packet containing the SSID of the electronic device 100. When the electronic device 100 is in the ST mode, the electronic device

TABLE 1

| Characteristic | | | | | | | | | | | | | | | | |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 |
| Value | 2 | 4 | 6 | 8 | 2 | 4 | | 0 | 0 | 0 | 2 | 1 | 0 | 4 | 1 | 0 | |
| Purpose | L | i | n | k | u | s | — | A | A | A | A | B | C | C | D | E | — |
| Length | | | | 6 | | | 1 | | | | 4 | | 1 | | 2 | 1 | 1 | 1 |

| Characteristic | | | | | | | | | | | | | | | |
|---|---|---|---|---|---|---|---|---|---|---|---|---|---|---|
| 18 | 19 | 20 | 21 | 22 | 23 | 24 | 25 | 26 | 27 | 28 | 29 | 30 | 31 | 32 |
| Value | 1 | 3 | 5 | 7 | 9 | 1 | 3 | 5 | 7 | 9 | 1 | 3 | 5 | 7 | 9 |
| Purpose | F | F | F | F | F | F | F | F | F | F | F | F | F | F | F |
| Length | | | | | | | | 15 | | | | | | | |

As shown in foregoing table 1, the electronic device 100 has a 32-byte SSID 300, in which the contents of the purpose fields show the purposes of the corresponding bytes. For example, the 1st to the 6th bytes (the purpose fields marked with "Linkus") are used as a specific identifier in the wireless network connection method provided by the present embodiment. The 8th to the 11th bytes (the purpose fields marked with "A") are used for indicating the communication protocol type of the electronic device 100 (for example, "0001" represents vCard, "0002" represents file exchange, "0003" represents unknown client matching, and so on). The 12th to the 13th bytes (the purpose fields marked with "B") are used for indicating the device type (for example, "01" represents smart phone, "02" represents tablet PC, "03" represents notebook computer, and "04" represents desktop PC). The 14th byte (the purpose field marked with "C") is used for indicating the Internet connection capability (for example, "0" represents the lack of Internet connection capability, and "1" represents the possession of Internet connection capability). The 15th byte (the purpose field marked with "D") is used for indicating the power supply mode (for example, "0" represents battery (or DC), and "1" represents AC). The 16th byte (the purpose field marked with "E") is used for indicating the battery state (for example, "0 (lowest)"-"9 (full)"). The 18th to the 32nd bytes (the purpose fields marked with "F") are used for indicating the device name or a basic service set identifier (BSSID) of the media access control (MAC) address. The 7th and the 17th bytes (the purpose fields marked with "-") are used for separating different symbols.

100 can get to know about the existence of other electronic devices in the AP mode and the attributes thereof by receiving packets containing the SSIDs of the other electronic devices in the AP mode. In another embodiment of the present invention, when the electronic device 100 is in the AP mode, the electronic device 100 also gets to know about the existence of other electronic devices in the AP mode and the attributes thereof by receiving other packets containing SSIDs within the nearby area. In yet another embodiment of the present invention, when the electronic device 100 is in the AP mode, the electronic device 100 cannot receive other packets containing SSIDs within the nearby area.

Figure 3:
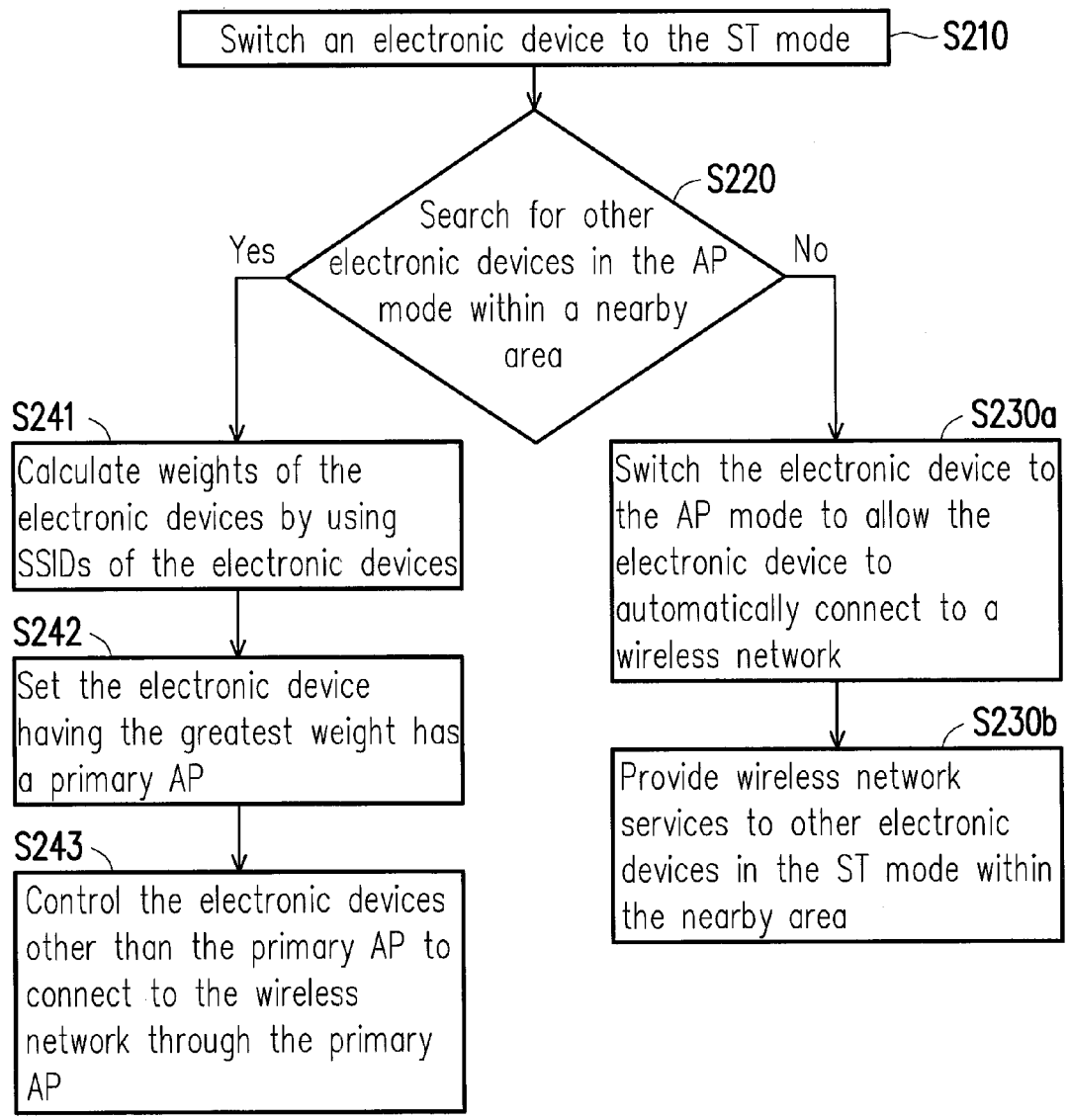
FIG. 3 is a flowchart of a wireless network connection method according to another embodiment of the present invention.

FIG. 3 is a flowchart of a wireless network connection method according to another embodiment of the present invention. As shown in FIG. 3, the wireless network connection method in the present embodiment includes steps S210-S220, S230a-S230b, and S241-S243. Below, the differences between the present embodiment and the embodiment described above will be described.

In step S241, if the control unit 130 finds at least one other electronic device in the AP mode, the control unit 130 respectively calculates the weights of the at least one other electronic device in the AP mode by using the SSIDs of these electronic devices. According to an embodiment of the present invention, when the control unit 130 calculates a weight by using a SSID, different purpose attributes have different impacts on the weight. For example, the impacts of the purpose attributes in foregoing table 1 on the weight are: device type (marked with "B")>Internet connection capability (marked with "C")>power supply mode (marked with "D")>battery state (marked with "E"). For example, the weight can be calculated by using the 12th to the 16th bytes (the purpose fields respectively marked with "BCCDE") of the SSID in table 1, where the weight=the 12th byte×10000+ the 13th byte×1000+the 14th byte×100+the 15th byte×100+ the 16th byte×1, and accordingly the value of the weight is 10410. However, the calculation of the weight is not limited to foregoing example and may have various variations.

In step S242, the control unit 130 sets the electronic device having the greatest weight among the at least one other electronic device in the AP mode as a primary AP. In an embodiment of the present invention, the control unit 130 sorts the other electronic devices in the AP mode according to the weights calculated in step S242 to find out the electronic device having the greatest weight. In another embodiment of the present invention, the control unit 130 alphabetically sorts the other electronic devices in the AP mode according to their device names or MAC addresses and sets the first or the last electronic device as the primary AP. In yet another embodiment of the present invention, the control unit 130 sets the electronic device having the greatest weight among the other electronic devices in the AP mode as the primary AP regarding a specific communication protocol type.

In step S243, the electronic device 100 and the other electronic devices in the AP mode are controlled to connect to the wireless network through the primary AP. As described above, the electronic devices other than the primary AP already get to know about the primary AP through the calculation of their weights therefore can obtain wireless network services from the primary AP in the nearby area.

Figure 4:
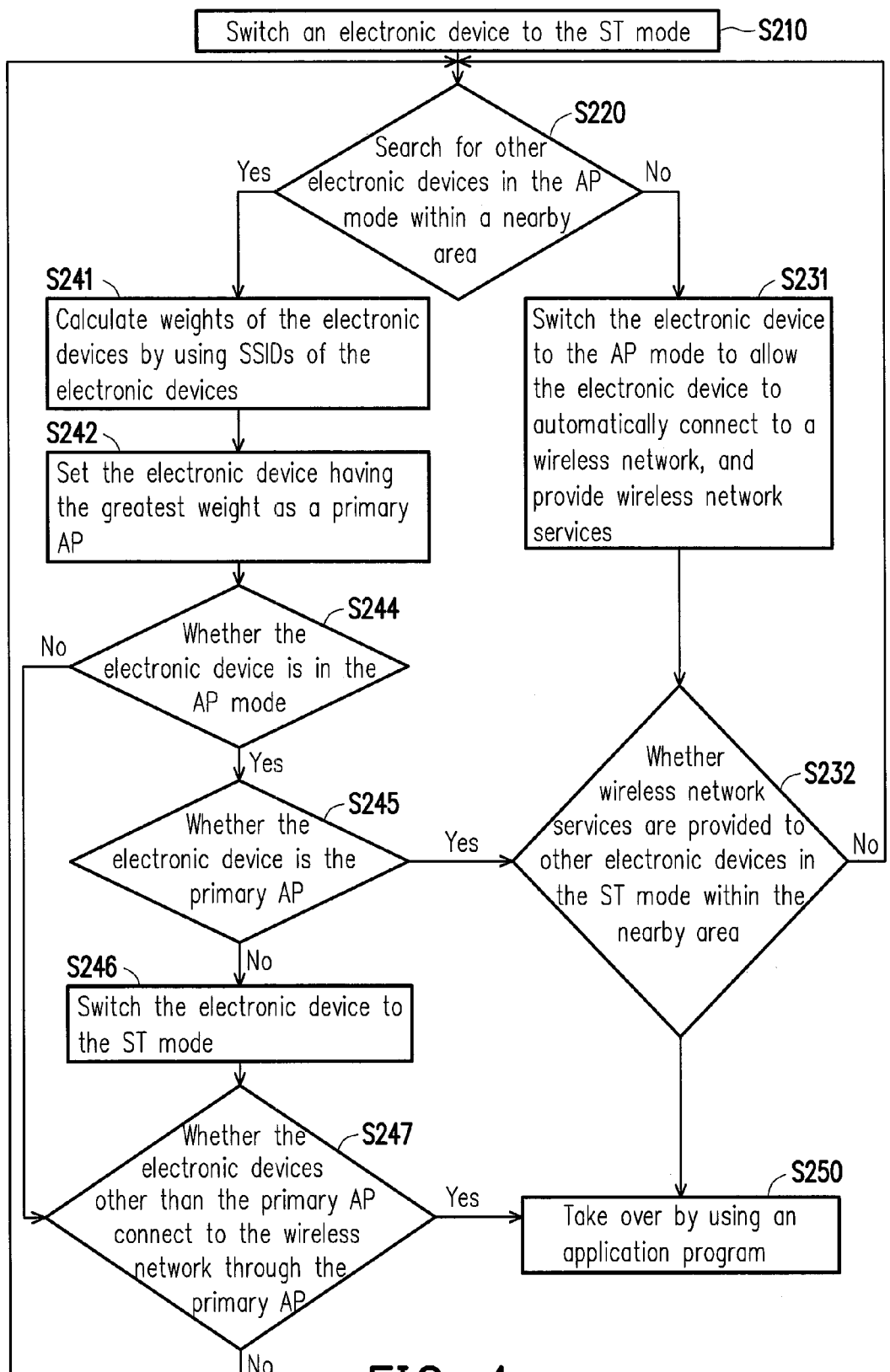
FIG. 4 is a flowchart of a wireless network connection method according to another embodiment of the present invention.

FIG. 4 is a flowchart of a wireless network connection method according to another embodiment of the present invention. As shown in FIG. 4, the wireless network connection method in the present embodiment includes steps S210-S220, S231-S232, S241-S242, S244-S247, and S250. Below, the differences between the present embodiment and the embodiments described above will be described.

In step S231, if the control unit 130 does not find at least one other electronic device in the AP mode, the control unit 130 switches the electronic device 100 to the AP mode so that the electronic device 100 automatically connects to the wireless network. As described above, because the control unit 130 already determines that there is no electronic device in the nearby area for providing any wireless network service, the control unit 130 switches the electronic device 100 itself to the AP mode to provide wireless network services and allow the electronic device 100 to automatically connect to the wireless network.

In step S232, the control unit 130 determines whether wireless network services are provided to at least one other electronic device in the ST mode within the nearby area. For example, the control unit 130 determines whether the wireless network services are provided during a second time interval, and the second time interval expires, the control unit 130 determines that no wireless network service is provided. If the electronic device 100 is switched to the AP mode and no any other electronic device receives the wireless network services provided by the electronic device 100, there may be other electronic devices in the AP mode within the nearby area but currently the electronic device 100 is not found due to its movement or some other reasons. In this case, step S220 is executed again to search for at least one other electronic device in the AP mode within the nearby area again.

In step S241, if the control unit 130 finds at least one other electronic device in the AP mode, the control unit 130 respectively calculates the weights of the other electronic devices in the AP mode according to the SSIDs thereof. Herein besides the other electronic devices in the AP mode, the electronic device 100 which has previously gone through steps S231 and S232 but has not been able to provide wireless network services now comes through steps S220 and S241 and is also in the AP mode therefore is able to provide wireless network services. Thus, in step S241, the weights of the other electronic devices in the AP mode and the electronic device 100 are respectively calculated by using the SSIDs of these electronic devices. Next, as described above, in step S242, the electronic device having the greatest weight among the at least one other electronic device in the AP mode and the electronic device 100 is set as the primary AP.

In step S244, the control unit 130 determines whether the electronic device 100 is in the AP mode. If the electronic device 100 is in the ST mode (i.e., the electronic device 100 cannot provide wireless network services), step S247 is executed next. Contrarily, if the electronic device 100 is in the AP mode (i.e., the electronic device 100 can provide wireless network services), step S245 is executed next.

In step S245, the control unit 130 determines whether the electronic device 100 is the primary AP. If the electronic device 100 is the primary AP, step S232 is executed next. If the electronic device 100 is not the primary AP (i.e., there are electronic devices possessing better wireless network providing capability within the nearby area), step S246 is executed to switch the electronic device 100 to the ST mode, and step S247 is executed next.

In step S247, the control unit 130 determines whether other electronic devices connect to the wireless network through the primary AP. If the electronic devices (the electronic device 100 and other electronic devices in the ST mode) other than the primary AP are not connected to the wireless network through the primary AP (i.e., these electronic devices do not receive the wireless network services provided by the primary AP due to the movement of the primary AP or some other reasons), step S220 is executed again to search for at least one other electronic in the AP mode within the nearby area again.

In step S250, if one of the at least one other electronic device in the AP mode found in step S220 and the electronic device 100 is set as the primary AP and the electronic devices other than the primary AP are controlled to connect to the wireless network through the primary AP (i.e., the electronic devices within the nearby area already get to know about the primary AP and accordingly a stable connection condition is achieved), the electronic devices within the nearby area can connect to the wireless network through the wireless network services provided by the primary AP. After that, the control unit 130 passes the electronic device 100 to an application program to complete the entire wireless network connection procedure.

As described above, in the present invention, when a wireless network connection function is started, the electronic device is switched to the ST mode to avoid any network communication conflict. After that, the weights of other electronic devices in the AP mode within a nearby area and the electronic device are respectively calculated by using the SSIDs of these electronic devices to set one of the other electronic devices in the AP mode and the electronic device as a primary AP, and the electronic devices other than the primary AP are controlled to connect to a wireless network through the primary AP, so that connection adjustments can be carried out in response to any environmental change or moving factor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless network connection method of an electronic device, wherein the electronic device has an access point (AP) mode and a station (ST) mode, the wireless network connection method comprising:
when the electronic device starts a wireless network connection function, switching the electronic device to the ST mode;
searching for at least one other electronic device in the AP mode in a nearby area;
when the at least one other electronic device in the AP mode is not found, switching the electronic device to the AP mode to allow the electronic device to automatically connect to a wireless network, and providing wireless network services to at least one other electronic device in the ST mode in the nearby area; and
when the at least one other electronic device in the AP mode is found, respectively calculating weights of the at least one other electronic device in the AP mode and the electronic device to set one of the at least one other electronic device in the AP mode and the electronic device as a primary AP, and allowing the at least one other electronic device in the AP mode and the electronic device other than the primary AP to connect to the wireless network through the primary AP.

2. The wireless network connection method according to claim 1, wherein each of the electronic device and the at least one other electronic device has a service set identifier (SSID), and the step of respectively calculating the weights of the at least one other electronic device in the AP mode and the electronic device to set one of the at least one other electronic device in the AP mode and the electronic device as the primary AP further comprises:
calculating the weights by using the SSIDs of the at least one other electronic device in the AP mode and the electronic device; and
setting one of the at least one other electronic device in the AP mode and the electronic device that has a greatest weight as the primary AP.

3. The wireless network connection method according to claim 2, wherein the step of when the at least one other electronic device in the AP mode is found, respectively calculating the weights of the at least one other electronic device in the AP mode and the electronic device to set one of the at least one other electronic device in the AP mode and the electronic device as the primary AP and allowing the at least one other electronic device in the AP mode and the electronic device other than the primary AP to connect to the wireless network through the primary AP further comprises:
determining whether the electronic device is in the AP mode;
when the electronic device is already switched to the AP mode, determining whether the electronic device is the primary AP;
when the electronic device is the primary AP, determining whether wireless network services are provided to the at least one other electronic device in the ST mode;
when the electronic device is not the primary AP, switching the electronic device to the ST mode and connecting to the primary AP; and
when the electronic device is not in the AP mode, connecting to the primary AP.

4. The wireless network connection method according to claim 3 further comprising:
when wireless network services are provided to the at least one other electronic device in the ST mode or the primary AP is connected, taking over by using an application program.

5. The wireless network connection method according to claim 2, wherein the SSID indicates a communication protocol type, an Internet connection capability, a device type, a power supply mode, a battery state, and a device name, or a basic service set identifier (BSSID).

6. The wireless network connection method according to claim 2, wherein when the electronic device is in the AP mode, the SSID of the electronic device is broadcasted, and when the electronic device is in the ST mode, the SSID of the at least one other electronic device in the AP mode is received.

7. The wireless network connection method according to claim 1 further comprising:
the at least one other electronic device in the AP mode and the electronic device other than the primary AP getting to know about a hardware AP according to a notification message issued by the primary AP and connecting to the wireless network through the hardware AP.

8. The wireless network connection method according to claim 1, wherein the step of when the at least one other electronic device in the AP mode is found, respectively calculating the weights of the at least one other electronic device in the AP mode and the electronic device to set one of the at least one other electronic device in the AP mode and the electronic device as the primary AP and allowing the at least one other electronic device in the AP mode and the electronic device other than the primary AP to connect to the wireless network through the primary AP further comprises:
setting another one of the at least one other electronic device in the AP mode and the electronic device as a secondary AP by using the weights of the at least one other electronic device in the AP mode and the electronic device, so that when the primary AP is not able to provide wireless network services, the at least one other electronic device in the AP mode and the electronic device other than the primary AP and the secondary AP are allowed to connect to the wireless network through the secondary AP.

9. An electronic device for establishing a wireless network connection, comprising:
a connection unit, having an access point (AP) mode and a station (ST) mode;
a storage unit, storing a weight; and
a control unit, coupled to the connection unit and the storage unit, and switching the electronic device to the AP mode or the ST mode,
wherein when the electronic device enters a wireless network connection procedure, the control unit is configured to control following steps:
when the electronic device starts a wireless network connection function, switching the electronic device to the ST mode;
searching for at least one other electronic device in the AP mode in a nearby area;
when the at least one other electronic device in the AP mode is not found, switching the electronic device to the AP mode to allow the electronic device to automatically connect to a wireless network, and providing wireless network services to at least one other electronic device in the ST mode in the nearby area; and
when the at least one other electronic device in the AP mode is found, respectively calculating weights of the at least one other electronic device in the AP mode and the electronic device to set one of the at least one other electronic device in the AP mode and the electronic device as a primary AP, and allowing the at least one other electronic device in the AP mode and the electronic device other than the primary AP to connect to the wireless network through the primary AP.

10. The electronic device according to claim 9, wherein each of the electronic device and the at least one other electronic device has a service set identifier (SSID), and when the electronic device calculates the weights of the at least one other electronic device in the AP mode and the electronic device to set one of the at least one other electronic device in the AP mode and the electronic device as the primary AP, the control unit is further configured to control following steps:
    calculating the weights by using the SSIDs of the at least one other electronic device in the AP mode and the electronic device; and
    setting one of the at least one other electronic device in the AP mode and the electronic device that has a greatest weight as the primary AP.

11. The electronic device according to claim 10, wherein when the electronic device already finds the at least one other electronic device in the AP mode, the control unit is further configured to control following steps:
    determining whether the electronic device is in the AP mode;
    when the electronic device is already switched to the AP mode, determining whether the electronic device is the primary AP;
    when the electronic device is the primary AP, determining whether wireless network services are provided to the at least one other electronic device in the ST mode;
    when the electronic device is not the primary AP, switching the electronic device to the ST mode and connecting to the primary AP; and
    when the electronic device is not in the AP mode, connecting to the primary AP.

12. The electronic device according to claim 11, wherein the control unit is further configured to control following steps:
    when the electronic device provides wireless network services to the at least one other electronic device in the ST mode or the primary AP is connected, taking over by using an application program.

13. The electronic device according to claim 10, wherein the SSID indicates a communication protocol type, an Internet connection capability, a device type, a power supply mode, a battery state, and a device name, or a basic service set identifier (BSSID).

14. The electronic device according to claim 10, wherein when the electronic device is in the AP mode, the SSID of the electronic device is broadcasted, and when the electronic device is in the ST mode, the SSID of the at least one other electronic device in the AP mode is received.

15. The electronic device according to claim 9, wherein the control unit is further configured to control following steps:
    the at least one other electronic device in the AP mode and the electronic device other than the primary AP getting to know about a hardware AP according to a notification message issued by the primary AP and connecting to the wireless network through the hardware AP.

16. The electronic device according to claim 9, wherein the control unit is further configured to control following steps:
    setting another one of the at least one other electronic device in the AP mode and the electronic device as a secondary AP by using the weights of the at least one other electronic device in the AP mode and the electronic device, so that when the primary AP is not able to provide wireless network services, the at least one other electronic device in the AP mode and the electronic device other than the primary AP and the secondary AP are allowed to connect to the wireless network through the secondary AP.

* * * * *